UNITED STATES PATENT OFFICE.

CARY COX, OF COVINGTON, GEORGIA.

IMPROVEMENT IN SOLDERING COMPOUNDS.

Specification forming part of Letters Patent No. 139,297, dated May 27, 1873; application filed April 19, 1873.

*To all whom it may concern:*

Be it known that I, CARY COX, of Covington, in the county of Newton and State of Georgia, have invented a new and useful Improvement in Soldering Compound, of which the following is a specification:

The object of this invention is to improve and simplify the cost of soldering tin, copper, and similar wares; and it consists in a compound or liquid to be used in combination with the solder compound, as hereinafter described.

In carrying out my invention I proceed as follows: I place in a glass jar or other suitable vessel the following substances, viz., sal-ammoniac, one-fourth of a pound; zinc in small pieces, one pound; sulphate of copper, one-fourth of a pound; now add muriatic acid, three pounds. Let the composition stand for about the space of twenty-four hours, uncovered, then pour it off from the dregs, and add three pints of soft water. Shake the compound so as to thoroughly mix the above ingredients and bottle for use. The solder is preferably used in the form of wire, the end of which is dipped in the compound, and applied to the heated surface of the article to be soldered.

By this process no soldering-iron is required. The heat is applied by means of the flame of a lamp or heated iron upon the opposite side; but I do not confine myself to any particular mode of using the compound; nor do I confine myself to the precise proportions named of the ingredients, or mode of combining them.

Having thus described my invention, I claim as new and desire to secure by Letters Patent—

A compound for soldering, composed substantially as described—that is to say, by combining muriatic acid, sal-ammoniac, sulphate of copper, zinc, and water, in about the proportions named.

CARY COX.

Witnesses:
H. T. SHAW,
S. H. LINDSAY.